(12) United States Patent
Suerbaum et al.

(10) Patent No.: US 10,548,077 B2
(45) Date of Patent: Jan. 28, 2020

(54) ENERGY SAVING IN A COMMUNICATIONS NETWORK

(75) Inventors: Clemens Suerbaum, Munich (DE); Yi Zhi Yao, Beijing (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/238,244

(22) PCT Filed: Aug. 12, 2011

(86) PCT No.: PCT/CN2011/001344
§ 371 (c)(1),
(2), (4) Date: Feb. 11, 2014

(87) PCT Pub. No.: WO2013/023320
PCT Pub. Date: Feb. 21, 2013

(65) Prior Publication Data
US 2014/0194110 A1    Jul. 10, 2014

(51) Int. Cl.
*H04W 52/02* (2009.01)
*H04L 12/28* (2006.01)

(52) U.S. Cl.
CPC ......... *H04W 52/0206* (2013.01); *Y02D 70/00* (2018.01)

(58) Field of Classification Search
CPC ............. H04W 52/00; H04W 52/0203; H04W 52/0206
See application file for complete search history.

(56) References Cited

U.S. PATENT DOCUMENTS

| | | | | |
|---|---|---|---|---|
| 2007/0230420 A1* | 10/2007 | Bumiller | ............... | H04W 48/18 370/338 |
| 2010/0234013 A1 | 9/2010 | Schmitt | | |
| 2011/0096688 A1* | 4/2011 | Sachs | .................... | H04W 48/18 370/252 |

(Continued)

FOREIGN PATENT DOCUMENTS

| | | |
|---|---|---|
| CN | 101965038 A | 2/2011 |
| CN | 102007801 A | 4/2011 |

(Continued)

OTHER PUBLICATIONS

Supplementary European Search Report dated Feb. 17, 2015 corresponding to European Patent Application No. 11870933.6.

(Continued)

*Primary Examiner* — Asghar H Bilgrami
(74) *Attorney, Agent, or Firm* — Squire Patton Boggs (US) LLP (57) ABSTRACT

A method of energy saving is applied to a mobile communications network comprising at least two radio access technology systems (102; 104) having a plurality of base stations (108-118). The method comprises the steps of: assigning (136a; 136b) respective priorities to the radio access technology systems; and an energy saving server (136a; 136b) instructing, on the basis of the priorities, a selected radio access technology system to reduce the operational state cells in a group of cells. This reduction occurs if the selected radio access technology system and/or another radio access technology system is able to maintain service to served mobile terminals.

11 Claims, 2 Drawing Sheets

(56) References Cited

U.S. PATENT DOCUMENTS

| | | | | |
|---|---|---|---|---|
| 2012/0250548 | A1* | 10/2012 | Swaminathan ... | H04W 36/0083 370/252 |
| 2012/0322446 | A1* | 12/2012 | Ramachandran ..... | H04W 48/18 455/436 |
| 2013/0130681 | A1* | 5/2013 | Lee ..................... | H04W 76/025 455/434 |
| 2014/0194110 | A1* | 7/2014 | Suerbaum ......... | H04W 52/0203 455/418 |
| 2014/0341109 | A1* | 11/2014 | Cartmell ............... | H04L 45/308 370/328 |

FOREIGN PATENT DOCUMENTS

| | | |
|---|---|---|
| CN | 102065524 A | 5/2011 |
| CN | 102100113 A | 6/2011 |
| EP | 2 445 269 A1 | 4/2012 |
| WO | WO 2011/009415 A1 | 1/2011 |

OTHER PUBLICATIONS

3GPP TR 36.927 V1.1.1 (Feb. 2011), Technical Report, 3rd Generation Partnership Project; Technical Specification Group Radio Access Networks; Evolved Universal Terrestrial Radio Access (E-UTRA); Potential solutions for energy saving for E-UTRAN (Release 10), Mar. 6, 2011, XP050497946, pp. 1-21.

International Search Report and Written Opinion dated May 24, 2012 corresponding to International Patent Application No. PCT/CN2011/001344.

3GPP TS 32.761 V10.0.0 (Dec. 2010), Technical Specification, 3rd Generation Partnership Project; Technical Specification Group Services and System Aspects; Telecommunication Management; Evolved Universal Terrestrial Radio Access Network (E-UTRAN) Network Resource Model (NRM) Integration Reference Point (IRP); Requirements (Release 10), Dec. 2010, 7 pages.

3GPP TS 32.521 V10.1.0 (Dec. 2010), Technical Specification, 3rd Generation Partnership Project; Technical Specification Group Services and System Aspects; Telecommunication Management; Self-Organizing Networks (SON) Policy Network Resource Model (NRM) Integration Reference Point (IRP); Requirements (Release 10), Dec. 2010, 26 pages.

3GPP TS 32.762 V10.4.0 (Jun. 2011), Technical Specification, 3rd Generation Partnership Project; Technical Specification Group Services and System Aspects; Telecommunication Management; Evolved Universal Terrestrial Radio Access Network (E-UTRAN) Network Resource Model (NRM) Integration Reference Point (IRP); Information Services (IS) (Release 10), Jun. 2011, 55 pages.

3GPP TS 32.522 V10.2.0 (Jun. 2011), Technical Specification, 3rd Generation Partnership Project; Technical Specification Group Services and System Aspects; Telecommunication Management; Self-Organizing Networks (SON) Policy Network Resource Model (NRM) Integration Reference Point (IRP); Information Service (IS) (Release 10), Jun. 2011, 33 pages.

3GPP TS 32.766 V10.4.0 (Jun. 2011), Technical Specification, 3rd Generation Partnership Project; Technical Specification Group Services and System Aspects; Telecommunication Management; Evolved Universal Terrestrial Radio Access Network (E-UTRAN) Network Resource Model (NRM) Integration Reference Point (IRP); Solution Set (SS) definitions (Release 10), Jun. 2011, 50 pages.

3GPP TS 32.526 V10.2.0 (Jun. 2011), Technical Specification, 3rd Generation Partnership Project; Technical Specification Group Services and System Aspects; Telecommunication Management; Self-Organizing Networks (SON) Policy Network Resource Model (NRM) Integration Reference Point (IRP); Solution Set (SS) definitions (Release 10), Jun. 2011, 18 pages.

3GPP TS 32.622 V10.0.0 (Mar. 2011), Technical Specification, 3rd Generation Partnership Project; Technical Specification Group Services and System Aspects; Telecommunication Management; Configuration Management (CM); Generic network resources Integration Reference Point (IRP); Network Resource Model (NRM) (Release 10), Mar. 2011, 28 pages.

European Patent Office, Communication pursuant to Article 94(3) EPC for corresponding European Application No. 11 870 933.6, dated Aug. 12, 2016.

Chinese Patent Office, Office Action corresponding to Chinese Patent Application No. 201180074115.X, dated Jul. 3, 2017.

Chinese Patent Office, Office Action corresponding to Appln. No. 201180074115.X, dated Dec. 5, 2017.

Communication pursuant to Article 94(3) EPC dated Jul. 26, 2018 corresponding to European Patent Application No. 11 870 933.6.

Chinese Office Action dated Jun. 14, 2018 corresponding to Chinese Patent Application No. 201180074115.X.

Chinese Office Action corresponding to Application No. 201180074115.X, dated Dec. 24, 2018.

* cited by examiner

ENERGY SAVING IN A COMMUNICATIONS NETWORK

This invention relates to energy saving in a communications network. It is particularly, but not exclusively, related to energy saving in a mobile communications network.

The term radio access technology (RAT) refers to the technology type, for example GSM (Global System for Mobile Communications), 3G (Third Generation), and LTE (Long Term Evolution), by which a mobile terminal is able to wirelessly access, that is by radio, a core network.

Energy saving (ES) schemes have been developed in which a RAT can be set into an energy saving mode by switching off cells, or more particularly, base stations. Energy saving management (ESM) in radio access networks (RANs) may save operating expenditure (OPEX) for network operators and, in general, may reduce the side effects of unnecessary energy usage.

Current 3GPP standards concerned with ESM (3GPP TS 32.522 and TS 32.762) relate to ES in a RAT of a network, the so-called intra-RAT case. 3GPP TS 32.522 defines an ES policy attribute having thresholds to control energy saving activation or deactivation in an intra-RAT case.

According to a first aspect of the invention there is provided a method of energy saving in a mobile communications network comprising at least two radio access technology systems having a plurality of access points, the method comprising the steps of:
assigning respective priorities to the radio access technology systems; and
instructing, on the basis of the priorities, at least one radio access technology system to reduce the operational state of at least one access point.

The method may involve selecting the at least one radio access technology system on the basis of the priorities.

Preferably, the operational state is reduced so that the access point provides a lower level of service. This may be so that it serves fewer mobile terminals. It may be so that it is capable of handling a lesser data throughput. It may be both. Reduction may be deactivation so that the access point does not provide service to any mobile terminals.

The radio access technology systems may be RATs. They may be RANs. They may provide access to a common coverage area.

The access points may be base stations. They may provide service to cells.

The priorities may be in the form of a priority list indicating the radio access technology systems and an order in which they are to be reduced in operational state.

Preferably, groups of access points are instructed to reduce their operational states. There may be a group list which identifies cells of different radio access technology systems which provide service to common coverage areas.

The network may have an energy saving functionality. It may be an energy saving server. It may be provided in a network management layer. It may be provided in an element management layer. It may be provided in a base station controller type functionality. It may be part of an operations and maintenance functionality of the network. The energy saving functionality may be a distributed functionality located in a number of entities and/or elements in the system.

The energy saving functionality may send an instruction to a lower layer that switching off of or turning down at least one radio access technology system is permitted. The lower layer may then decide, on the basis of measurements and/or statistics and/or policies whether a radio access technology system can be switched off or turned down. A decision may be made based on whether a sufficient level of service will be maintained. A determination may be made in the energy saving functionality that energy saving management is to be applied.

In the case that operational state of a radio access technology system is reduced, mobile terminals served by that radio access technology system which now cannot continue to be served, may be handed over to the cells of another radio access technology system.

One or more specified groups of cells may be instructed to turn reduce the operational state of the cells in the group(s) of a specified radio access technology system, according to respective priorities.

The instruction may be provided in the case that a policy indicates that energy saving is appropriate. The policy may relate to time. It may relate to load. The instruction may be generated and provided as a result of network conditions.

Energy saving may be instructed according to a time schedule indicating times at which energy saving is to be activated and deactivated. This may be provided by a higher level management layer which provides the schedule to the energy saving functionality. A higher level management layer may activate and deactivate energy saving according to a time schedule. The time schedule may be pre-defined or it may be generated according to network conditions and/or policies. It may be generated in a higher level management layer. It may be generated in an energy saving functionality.

The energy saving functionality may generate a time schedule based on traffic and/or service related performance measurements. It may do this in response to receiving an instruction to act autonomously.

The energy saving functionality may monitor the passing of time. It may notify an element management layer, or it may notify a controller functionality, to arrange for activation and deactivation.

The activation and deactivation times do not necessarily represent an absolute deactivation command.

Energy saving may be carried out taking load into account. This may be done by means of a threshold list. This may indicate thresholds and respective durations. The actions related to a threshold may only be applied if the threshold has been passed for at least the length of the duration associated with the threshold. There may be respective sets of thresholds for respective radio access technology system.

Thresholds may be applied to the energy saving functionality by a higher level management layer. The thresholds may be pre-defined or may be generated according to network conditions and/or policies. They may be generated in a higher level management layer. They may be generated in an energy saving functionality. It may be based on a traffic/service model, which can be based on traffic and/or service related performance measurements. If thresholds are generated or changed by the energy saving functionality, it may be provided with a prioritisation list.

A threshold may be associated with a particular radio access technology system. The arrangement of thresholds may contain an implicit prioritisation of radio access technology systems.

The load of a group of cells may be compared to a threshold. Crossing a threshold may indicate that a change in energy saving level to be applied to a cell or to a group of cells. A change in energy saving level may be applied in respect of some of these cells, and not in respect of others of these cells.

An energy level list may be provided which identifies different levels of energy saving which may be applied to cells or groups of cells. The energy level list associated with a particular cell may have an indication applied to it of the relevant energy saving level currently applicable to that cell.

A decision whether to change energy saving level of a cell may occur if the cell, at a proposed energy saving level, is able to provide an acceptable level of service to the mobile terminals it currently serves.

A decision whether to change energy saving level of a cell may occur if the cell, at a proposed energy saving level, is able to provide an acceptable level of service to some of the mobile terminals it currently serves if some of the mobile terminals it currently serves are handed over to another cell. Handing over mobile terminals in these circumstances may mean a change to the energy saving level of a cell receiving the handovers.

Energy saving levels of a cell and a neighbouring cell may be traded so that one cell has its energy saving level increased while another cell has its energy saving level decreased.

The energy saving level change applied to a group may be for it to be increased or decreased. Reducing the energy saving levels of cells may in some cases mean reactivating cells which had, in effect, been deactivated by being at a maximum energy saving level.

There may be a series of thresholds to be passed with each threshold passed leading to an appropriate energy saving adjustment to a group of cells.

In a group, some cells may be set to have a maximum energy saving level while other cells may not have reached this level.

On receiving an indication that energy saving is to be applied, it may be carried out in respect of a number of groups under the control of an energy saving functionality in turn.

A request to change energy saving levels of cells in a group may be applied to some cells and not to others. Cells may have their energy saving levels changed by the different amounts. This may result in cells in a group having different energy saving levels.

There may be two types of energy saving levels. A first type may be applied to the network as a whole, or to parts of the network. A second type applied to individual cells as a result of applying thresholds.

A network according to the invention may be able to avoid a complete shut-down on one radio access technology system so that, even though it operates in a low energy state, it may still provide service. It may provide service over the whole extent of its coverage area Energy saving according to the invention may simply aim to save the most energy or it might, in recognising different service capabilities of the different radio access technology systems, decide not to reduce activity of cells of a particular radio access technology system which is capable of providing one or more services which are not supported by one or more other radio access technology systems.

According to a second aspect of the invention there is provided a communication system capable of providing energy saving comprising:
at least two radio access technology systems having a plurality of access points; and
and a management functionality capable of assigning respective priorities to the radio access technology systems and capable of instructing, on the basis of the priorities, at least one radio access technology system to reduce the operational state of at least one access point.

According to a third aspect of the invention there is provided an energy saving functionality capable of energy saving in a mobile communications network comprising at least two radio access technology systems having a plurality of access points, the energy saving functionality being capable of assigning respective priorities to the radio access technology systems and being capable of instructing, on the basis of the priorities, at least one radio access technology system to reduce the operational state of at least one access point.

According to a fourth aspect of the invention there is provided a computer program product comprising software code that when executed on a computing system performs a method of energy saving in a mobile communications network comprising at least two radio access technology systems having a plurality of access points, the method comprising the steps of:
assigning respective priorities to the radio access technology systems; and
instructing, on the basis of the priorities, at least one radio access technology system to reduce the operational state of at least one access point.

Preferably, the computer program product has executable code portions which are capable of carrying out the steps of the method.

Preferably, the computer program product is stored on a computer-readable medium.

Preferably, the computer program product in stored in a non-transient manner.

Embodiments of the invention will now be described, by way of example only, with reference to the accompanying drawings in which.

Figure 1:
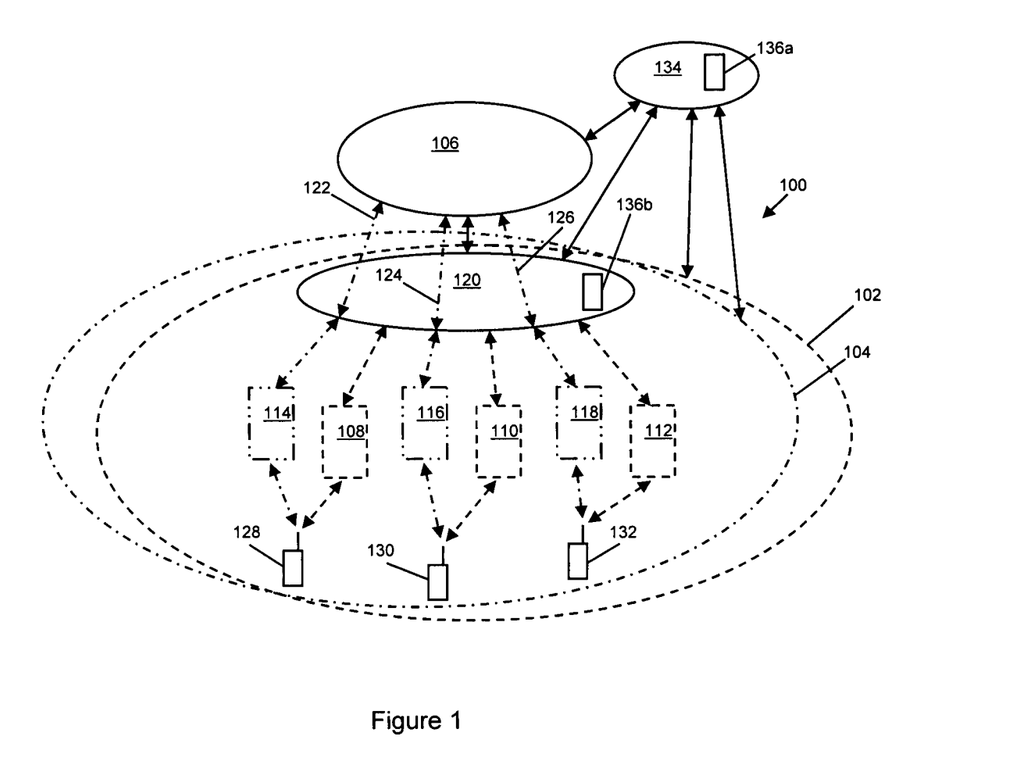
FIG. 1 shows a mobile communication network according to the invention.

The invention will now be described with respect to FIG. 1. FIG. 1 shows a mobile communications network 100 comprising a RAN of a first RAT type 102, such as GSM, a RAN of a second RAT type 104, such as LTE, and a core network 106. Such an arrangement may occur by a network operator building a network having a RAN of the first RAT type and then adding to it a RAN of the second RAT type. One reason for this may be to add to the network a RAN which is more advanced than the RAN of the first RAT type having enhanced capabilities which hitherto have not been provided by the network, such as better data rates enabling media streaming.

The core network 106 has functionality to provide for call switching/routing and call control, service provision, authentication and charging, and interconnection enabling access to other networks. The RANs comprise base stations and a corresponding control functionality 120. The GSM RAN 102 has a number of base stations 108, 110, and 112, and the LTE RAN 104 has a number of eNB base stations 114, 116, and 118. In FIG. 1, the GSM RAN 102 and its corresponding base stations is represented by dashed lines and the LTE RAN 104 and its corresponding base stations is represented by dashed-dotted lines.

The base stations of each RAN may interact with the RAN control functionality 120. In the case of a GSM RAN 102, the control functionality may be embodied in the form of base station controllers (BSCs). In the case of an LTE RAN, the control functionality does not have to exist as a separate entity outside the LTE base stations 114, 116, and 118 and they may have their own respective functionalities enabling self-control. However, even if the LTE base stations 114, 116, and 118 are provided with self-control functionalities, it is still possible for them to be under the control of the RAN control functionality 120, at least in some respects.

It will be understood that the core network 106 may exercise control over the base stations either via the RAN control functionality 120 or directly between the core network 106 and base stations themselves. This is shown for example in respect of the LTE RAN 104 in which dashed-dotted lines 122, 124, and 126 represent lines of control bypassing any control functionality 120 which may be present.

The base stations of each RAN provide radio access to mobile terminals 128, 130, and 132 present in cells served by respective base stations.

An operations, administration, and maintenance (OAM) function 134 is linked to the core network 106 and to the RANs 102 and 104 and is capable of configuring and provisioning network nodes of the RANs 102 and 104 and the core network 106. The OAM function 134 may be provided with an energy saving (ES) function (also referred to as an ES server (ESS)) 136*a*. The operation of the ESS will be described in the following. It should be noted that, rather than the ESS 136*a* being provided in the OAM function 134, an ESS 136*b* may be provided in the RAN control functionality 120 instead. It should be noted that this is a centralised approach to providing an energy saving capability. Alternatively, the ESS may be a distributed functionality located in a number of entities and/or elements in the system. This latter case may be particularly applicable to implementation of the invention in which the ESS is present at a level lower than a network management level, for example in an element management layer.

The OAM function 134 is concerned with configuration management (CM), performance management (PM), and fault management (FM). The OAM function 134 collects network information which is used by a network operator to monitor the health and performance of the network 100. The OAM function 134 is a separate system from the core network 106 although both the core network 106 and the OAM function 126 may be present within the domain of the network operator with both being under its control.

Management of the network 100 may take place according to the principles of Telecommunication Management Network (TMN). In this case, there are a plurality of layers used in the management of a network, with each layer having two functions: A manager function in a managing system for a next lower layer (for those layers where such a lower layer is present) and an agent function in a managed system for the next higher layer (for those layers where such a higher layer is present).

Two management layers should be noted in particular: The first layer is the network management (NM) layer, whose functionality is provided by a (super-regional or national) network management system (NMS). The second layer is the network element management (EM) layer, whose functionality is provided by regional element managers, also called element management systems (EMS). The EMS acts as the manager of network elements (NEs) of the next lower layer and acts as agent to the NM layer/NMS. There is an interface between the EM layer and the NE layer and an interface between the NM layer and the EM layer, which may be referred to as the Itf-N interface.

Manager/agent-communication may be carried out via a management interface that is characterised in an object-oriented environment by a communication protocol (such as Common Object Request Broker Architecture (CORBA), Common Management Information Protocol (CMIP), or Simple Network Management Protocol (SNMP)) and by an object model (also called Network Resource Model (NRM)).

It will be understood that although in FIG. 1 the OAM function 134 is shown as a unitary entity, it may comprise the NM and EM layers.

It will be seen from the foregoing that the network 100 comprises RANs of different RAT types. As a result, a network operator controls a network comprising two RANs of different RAT types providing access to a common core network. In this case, mobile terminals in a common coverage area can be offered network access to the same network by different RAT types and, depending on local conditions, there may be handover from one RAT type to another within the same network.

Although the embodiment of FIG. 1 relates to a network comprising a GSM and an LTE RAN, according to the invention, other RAN combinations may be present, for example GSM and 3G, 3G and LTE, and GSM, 3G, and LTE.

Running two RANs of different RAT types so that they offer access to a mobile network is energy intensive. According to the invention, RAT prioritisation for energy saving purposes is provided in which advantage is taken of different RAT types providing access to a common coverage area.

In the following, reference is made to "partial" switching off of cells. This may refer, in terms of a cell, to reducing the operating radio capabilities of a base station, for example switching off some carriers while leaving others on. This may involve the RAT staying in a listening mode to find out if a mobile terminal is trying to access it. In terms of a group of cells, the term may refer to switching off some cells while leaving others operational or turning down some or all of the cells in the group. It should be noted that with suitable optimisation of cells in the group, coverage of the cells can be maintained. Partial switching off may be expressed as "turning down" a cell or a group of cells. Therefore, it will be understood that a cell can be switched off wholly or partially.

In a first embodiment of the invention, a new information object class (IOC) InterRatEnergySavingControlInformation is defined and for this IOC a priority list attribute, EnergySavingRatPriorityList, is defined in which the RATs are set out in a priority list giving the order in which they are to be switched off, whether this is totally or partially, with a RAT having a higher position in the list being switched off in preference to a subsequent RAT. The attribute is set by a controller, which may be a human operator or a higher level system, and stored in the ESS.

In an example implementation, there are two RATs, one high bandwidth RAT and one low bandwidth RAT, for example LTE and GSM. In such a case, the LTE RAT may have a higher priority for energy saving and so may be switched off in preference to the GSM RAT. Rather than there being RATs of two different air interface types, such as LTE and GSM, the RATs may be two types of LTE using different frequency bands, for example LTE2100 and LTE2600. The same may apply to GSM.

The network operator may make a decision weighing the energy consumption of different RAT types and their capabilities. This analysis can be done offline with the result being put into the priority list. This may involve consideration of the business relevance of the RATs and associated energy efficiencies.

The priority list is usually set once by the network operator and is either fixed or changed occasionally. Analysis of network use could be used to trigger a change. In an implementation of the invention, the list of RATs in the list may be modifiable. For example, it may become longer as new RATs are added. This may require a change to the set of values, that is the possible list of RATs.

In the first embodiment, the priority list attribute may be associated with a sub-network representing a set of managed entities such as a set of eNBs or other network elements. For example it may be added to an IOC under a SubNetwork IOC. An example of this attribute is as follows:

TABLE 1

| Attribute | Definition | Legal Values |
|---|---|---|
| EnergySavingRatPriorityList | List of RAT in priority order. The first element in the sequence shall be the first candidate for energy saving, the second element shall be the second candidate etc. | Sequence of RAT: [A list of RATs in priority order is to be added selected from the list of possible RATs below.] RAT: GSM900 GSM1800 GSM2600, WCDMA2100, CDMA200, LTE2100, LTE2600 |

TABLE 2

| Attribute | Definition | Legal Values |
|---|---|---|
| RatDeactivationScheduleList | This list tells the energy saving function the times at which respective RATs may be considered for energy saving measures. | Sequence of RatDeactivationSchedule RatDeactivationSchedule: structure { RAT, Schedule } Schedule: sequence of periods Period: structure { Day, Starttime, Endtime} Day: enum of Monday to Sunday |

In this example, in the "Legal Values" column, a standard comprehensive set of possible RATs is present but there is no specific list of those RATs to which ES is to be applied. Naturally, in a practical embodiment, the list of RATs in priority order would be present and would be selected ones of the standard comprehensive set. For example, the priority list of RATs may be GSM900, GSM1800, and LTE2100.

Use of the priority list will now be described. If a decision is made for a network to apply ES, the RAT at the top of the priority list may be turned off, or its cells may be turned down. Any mobile terminals served by that RAT which now cannot continue to be served, for example because of a capacity reduction, may be handed over to the cells of another RAT to ensure that mobile terminals in an area to which ES is being applied continue to be served, although this may be by a different RAT. The decision to apply ES may be made by an ESS present in a higher level management layer, such as an NM or an EM layer. In a refinement of this embodiment, rather than turning off all of the cells of a RAT, one or more specified groups of cells may be instructed to turn off/turn down the cells in the group(s) of the specified RAT, according to the priority list sequence of the order in which RATs should be turned off/turned down. Groups of cells to be subjected to ES may be defined by use of the Table 5 presented and described in the following. It will be understood that if in this case a number of ESSs are controlling a number of groups of cells, then the ES functionality of the network is distributed.

In a second embodiment of the invention, ES is based on the time of day. This may involve one or more RATs being switched off, wholly or partially, over certain time periods.

There are a number of variants of this embodiment of the invention.

In a first variant, a higher level management system, which may be a self-organising network (SON) server in the EM layer or above, or a network operator, applies the schedule to the ESS where it is stored. The schedule may be generated by the higher level management system. The ESS can be in the NM, EM or NE layer, that is, in a common base station controller. If the ESS makes a determination that conditions are suitable for a RAT, according to the priority list, to be deactivated or turned down, it may then send an instruction to the EM layer that optional switching off of one or more RAT types is now permitted. The EM may then decide, on the basis of measurements and/or statistics and/or policies whether a RAT can be switched off, provided a sufficient level of service is maintained. This may be a load-based decision based on the balance of load between cells in a group.

In a second variant, the higher level management system, SON server or network operator activates and deactivates ES according to a specified schedule. In one implementation, a schedule list attribute is added to the SubNetwork IOC or to an IOC under the SubNetwork IOC.

Table 2 shows a single RAT and its corresponding time schedule for the purposes of brevity. It will be understood that in practice the schedule list may contain respective schedules for respective RATs with each schedule having a time at which ES is to be activated and a time at which it is to be deactivated. The order in which RATs are activated/deactivated may be carried out in the sequence in which RATs are presented in Table 2. There may be a number of activation/deactivation times in a 24-hour period. There may be activation/deactivation times specified for each day of the week.

As an example, the following schedule may be defined for a several RATs. An LTE RAT can be switched off over a time period from 09:00 to 11:00, a UMTS RAT can be switched off over a time period from 11:00 to 18:00, and a GSM RAT can be switched off over a time period from 18:00 to 23:00.

The ESS is provided with the attribute of Table 2 and monitors the passing of time. When the activation time for a RAT arrives, ES for that RAT is started and when the deactivation time arrives, ES is stopped. The ESS notifies the EM layer to arrange for activation and deactivation of the RATs to occur.

The activation and deactivation times for a RAT do not have to represent an absolute command for switching off. If one of these times arrives, the RAT is allowed to be activated/deactivated but does not have to be so. In other words, it can be considered to be a policy rather than an instruction.

In a third variant, the ESS may schedule ES by itself based on a traffic/service model. This can be based on traffic and/or service related performance measurements which may have been collected over a period of time. In the traffic/service model, the ESS may determine the total traffic and the kinds of services which are dominant during different time periods. As a result, the ESS may determine which RATs should continue in operation and which should be switched off. The ESS may be configured to make a decision that now is a good time to switch off a RAT. Alternatively, it can build up its own schedule.

In the third variant, the ESS receives as input an instruction to act in this autonomous way. The ESS may additionally be provided with information about a target it should aim for. This may be an autonomous control attribute, which may be applied to the ESS, as is shown in Table 3 in the following. Accordingly, the ESS may apply decisions to target maximum energy saving, maximum service fulfilment, or a combination of these aims. These can be considered to be policies. As an example, this could be that in case of conflict between ES and service fulfilment, it should aim to provide a suitable level of service to users. Alternatively, it might aim to save energy.

In one implementation, the autonomous control attribute is added to the SubNetwork IOC or to an IOC under the SubNetwork IOC.

TABLE 3

| Attribute | Definition | Legal Values |
|---|---|---|
| AutonomousEnergySavingControl | This input determines if the energy saving function decides on its own about energy saving activities (e.g. sets up the thresholds to change the level of energy saving). | Enum: AutonomousEnergySavingActivated, AutonomousEnergySavingDeactivated |
| AutonomousEnergySavingTarget | This input determines if the energy saving function should target with its decisions maximum energy saving or maximum service fulfilment or a combination | Enum: MaxEnergySaving, CompromiseEnergySavingAndServiceFulfillemnt MaxServiceFulfillment |

The AutonomousEnergySavingTarget attribute is applied if the attribute AutonomousEnergySavingControl is set to "activated".

In a third embodiment of the invention, ES is carried out taking load into account. This may be done by means of a threshold attribute. In one implementation, the threshold attribute, defined as InterRatESThresholdsList according to Table 4 in the following, is added to the SubNetwork IOC or to an IOC under the SubNetwork IOC. This attribute may be set in respect of a cell or a group of cells.

TABLE 4

| Attribute | Definition | Legal Values |
|---|---|---|
| InterRatESThresholdsList | This defines for each RAT thresholds to trigger a change in energySavingLevel. Crossing threshold 1 for longer than the specified duration triggers a change from no energy saving to energy saving level 1 or vice versa. Crossing threshold2 for longer than the specified duration triggers a change from energy saving level 1 to energy saving level 2 etc. Crossing the highest threshold for longer than the specified duration triggers a change from highest energy saving level to complete switch-off. | Sequence of InterRatESThresholds InterRatESThresholds: structure { RAT, ThresholdAndDuration List } ThresholdAndDuration List: structure { Threshold, TimeDuration } Threshold *): Integer, unit kByte/s TimeDuration: Integer (in unit of seconds) |

*) Remark: The unit for this parameter may be expressed in other terms, for example. percentage of maximum cell capacity.

As can be seen, there are respective sets of thresholds for respective RATs with each threshold set having a number of rate-related thresholds and a duration.

The threshold(s) can be applied to the ESS by:
(i) a higher level management system, such as a SON server or a network operator, to the ESS; or
(ii) the ESS itself based on a traffic/service model, which can be based on (historical) traffic and/or service related performance measurements.

In the case of (i), the thresholds may also be used to trigger notifications about a threshold being crossed in an implementation in which the EES resides in the NMS.

According to this embodiment, a decision is made, for example in a higher level, to request an ESS to apply ES to a group of cells for which no cell has not yet been put into an energy saving state. In this case, referring to Table 6, the cells have an energySavingLevel (ESlevel) at energySavingLevel0. The ESS refers to the CellListForInterRatEs attribute of Table 5 to identify the cells to be taken into consideration, and the load of the group as a whole is measured based on the identified cells. The ESS refers to the InterRatESThresholdsList attribute of Table 4 and compares the measured load to the thresholds of Table 4 in turn.

Application of the thresholds will now be described further. In this case, a first RAT, RAT1, is LTE and is provided with two ES levels, and a second RAT, RAT 2, is GSM and is provided with three ES levels.

In order to describe the application of the InterRatESThresholdsList attribute, a specific example of Table 4 will be considered in which the thresholds are:
{
LTE2100:
    Threshold A: 20 MByte/s, 1 min
    Threshold B, 10 MByte/s, 1 min
GSM1800:
    Threshold C: 05 MByte/s, 1 min
    Threshold D: 02 MByte/s, 5 min
    Threshold E: 01 MByte/s, 10 min
}

It will be noted that there is a particular RAT type associated with each threshold and also that the arrangement of thresholds contains an implicit RAT prioritisation so that in terms of application of ES, it will firstly be applied to LTE and then to GSM. Although in this implementation the thresholds for each RAT in effect create a range for each RAT and these ranges are non-overlapping, this does not necessarily have to be the case. It might take this form in an implementation in which one RAT has a potential bandwidth much higher than the other. However, in another implementation, thresholds applying to one RAT may be interspersed with thresholds applying to another RAT. In other words, threshold ranges of one RAT are mixed up with threshold ranges of another RAT.

Use of the thresholds will now be described in general. The load of a group of cells is measured. If the measured load is above threshold A, no change is applied to either RAT. If the measured load is below threshold A and above threshold B, put cells of RAT 1 into ESlevel1, that is one step up, while no change is applied to RAT 2. If the measured load is below threshold B and above threshold C, put cells of RAT 1 into ESlevel 2, that is one step up, while no change is applied to RAT 2. If the measured load is below threshold C and above threshold D, put cells of RAT 2 into ESlevel1, that is one step up, while no change is applied to RAT 1. If the measured load is below threshold D and above threshold E, put cells of RAT 2 into ESlevel2, that is one step up, while no change is applied to RAT 1. If the measured load is below threshold E, put cells of RAT 2 into ESlevel3, that is one step up, while no change is applied to RAT 1.

It will be seen that in this simplistic approach, the applications of the thresholds A and B are independent of the applications of the thresholds C, D, and E. To put it another way, moving from the threshold A to B has no effect on the ESlevel of RAT 2, and moving from the threshold C to D has no effect on the ESlevel of RAT 1. However, as will be seen in the following, more complex interactions of ESlevels of different RATs may occur when a threshold is crossed.

Further detail of the operation of this embodiment of the invention will now be described in terms of the response of the ESS to a threshold being crossed. As has been mentioned in the foregoing, the ESS may be requested to apply ES measures. In this case, the ESS will seek to apply ES measures to the groups it controls, that is, for the groups to require less energy to operate. In this case, a group is selected, its load is measured, and the measured load is compared with the thresholds of Table 4. At this point, it should be noted that since the group may contain cells of more than one RAT type, the measured load may be representative of a number of RAT types.

If the measured load crosses a threshold, the cells of the RAT type associated with that threshold can, but not must, have their ESlevels moved up or down an ESlevel. However, when the threshold has been passed and the ESS is working out a suitable ESlevel to apply to the cells of the same RAT type in the group, it has to take into account the loading of the individual cells. So while the threshold might indicate that all cells of RAT1 should have their ESlevels increased, in respect of some of these cells, increasing the ESlevel might be permitted and in respect of others of these cells, increasing the ESlevel might not be permitted.

Permitted increasing of the ESlevel will be considered first. Considering individual cells and taking into account their loads, for some or all of the cells the ESlevel can be increased because at the increased ESlevel these cells are able to provide an acceptable level of service to the mobile terminals they are currently serving. In this case, the ESlevel of these cells may be increased. In the event that some of the cells are not able to provide an acceptable level of service to the mobile terminals they are currently serving at the increased ESlevel, considering individual cells and taking into account their loads, it may be determined that, when considering the loads of one of these cells and the loads of neighbouring cells in the same RAT of the group and/or neighbouring cells in another RAT of the group, if a sufficient number of mobile terminals were to be handed over from the cell to one or more neighbouring cells in the same RAT, or in another RAT, having sufficient capacity to receive them, the cell is able to serve any remaining mobile terminals while at an increased ESlevel. In this case, the ESlevel of this cell may be increased. In carrying out handovers of mobile terminals to one or more neighbouring cells, it may be determined by the ESS that the neighbouring cell(s) receiving the handovers may have sufficient capacity to receive them if the ESlevel(s) of the neighbouring cell(s) remain the same or are decreased. In the latter case, the ESlevel(s) of the neighbouring cell(s) may be decreased. The cells receiving the mobile terminals may be set to provide a maximum capacity, or at least have their capacities set to provide full service.

Therefore, it will be seen that the ESlevels of a cell and a neighbouring cell may be traded so that one cell has its ESlevel increased while another cell has its ESlevel decreased.

Not permitted increasing of the ESlevel will now be considered. In this case, some of the cells are not able to provide an acceptable level of service to the mobile terminals they are currently serving at the increased ESlevel. Furthermore, considering individual cells and taking into account their loads, and the loads of neighbouring cells in the same RAT of the group and/or neighbouring cells in another RAT of the group, it is not possible for a cell to hand over a sufficient number of mobile terminals to one or more neighbouring cells in the same RAT or in another RAT to enable the cell to serve any remaining mobile terminals while at an increased ESlevel. This may be because it would overload cells which might potentially receive handovers. In addition, the neighbouring cells may not provide enough capacity to receive the sufficient number of mobile terminals even with the ESlevel(s) of neighbouring cell(s) being decreased.

In the foregoing description of the third embodiment, the description relates to increasing ESlevels. It will be understood that the same principles may be applied to a decrease in the ESlevels of the cells of the same RAT type in a group. This could be triggered, for example, if the ESS is requested that the groups it controls are not to be in an energy saving state, or is requested that the groups are to be in an energy saving state at which the amount of energy saving is at a reduced level, that is the groups may be provided with more energy to operate. In this case, it may be determined by the ESS that a cell which has its ESlevel decreased can receive handovers from a neighbouring cell or cells. In this case, the ESS may determine that the ES levels of the neighbouring cell or cells may be increased because they are able to serve any remaining mobile terminals at an increased ESlevel.

In the foregoing, a description is provided of how the ESS responds to a threshold being passed. It will be understood that a series of thresholds may be passed, (that is those indicated in the thresholds of Table 4) and with each threshold passed, the ESS will carry out an appropriate adjustment to the groups it controls according to the preceding description. As a result, if a RAT passes all of the thresholds associated with it, it may reach a maximum ESlevel at which some or all of its cells are switched off, or at least put into a state in which they are not providing service to mobile terminals. It will be understood that some of the cells of this RAT may continue to operate if they have not reached this maximum ESlevel, even though the final threshold for all groups relating to that RAT may have been passed.

It should be noted that even if ES measures are in place, if the load of a group becomes higher than one of the thresholds, for example by there being more service demand for cells in that group when considered together, the ESS may respond by deciding to reduce the ESlevels of cells of a corresponding RAT type in the group, which may in some cases mean reactivating cells which had, in effect, been deactivated by being at the maximum ESlevel. Equally, if ES measures are to be removed or reduced so that the amount of ES to be achieved is reduced, thus allowing a greater energy consumption, cells may become reactivated.

In the third embodiment, the method has a comparison step between load and threshold for each threshold in turn and each time a threshold is passed, then for the RAT for which that threshold is defined, the energy saving level is adjusted by one ES level increment. In another implementation, stepping through thresholds may be avoided by the ESS having appropriate "intelligence" to "know" that crossing, say, the threshold C, means that it should directly apply ESlevel 2 to RAT 1 and ESlevel 1 to RAT 2.

In the foregoing, it should be noted that when reference is made to crossing a threshold, the actions related to that threshold are only applied if the threshold has been passed for at least the length of the duration associated with the threshold. Furthermore, in terms of the thresholds, it should be noted that the thresholds are associated with ES levels but only in a loose sense, meaning that, as can be seen in the foregoing, crossing a threshold does not necessarily mean that ESlevels of cells in a group will slavishly follow.

In the foregoing ES is described as being applied to a group. However, on receiving an indication that ES is to be applied, the ESS may carry out the foregoing operations in respect of each of the groups under its control in turn. If there is a single ESS, applying ES for all groups can, in effect, mean that ES has been applied to the whole of each of the RATs present in the network.

The overall effect of the foregoing is that, in respect of the RAT for which the threshold has been passed, cells of that RAT in the group tend to have their ESlevels increased or reduced, depending on the direction in which the threshold has been passed, while there may be an opposite effect on the ESlevels of cells of other RATs in the group. Therefore, it can be seen that application of the thresholds can cause cells of a higher mobile terminal-serving capability to hand mobile terminals to cells of a lower mobile terminal-serving capability, and vice versa, while in a more general sense, one of the RATs may have its activity level reduced (possibly to zero in terms of providing service to mobile terminals), and another RAT may have its activity level increased (possibly to a maximum in terms of providing service to mobile terminals).

It will be understood that a request to change ESlevels of cells of the same RAT type in a group might be applied to some cells and not to others. This can mean that even though a threshold has been passed and there is a request to change the ESlevel for the cells of the same RAT type in a group, not all of the cells may have their ESlevels changed by the same amount, and also that cells of the same RAT type in the group may have different ESlevels.

In the preceding description of the effect of applying thresholds, the ESS applies ES to a group of cells. In one implementation of the invention, there may be a number of different levels of ES representing different amounts of ES to be applied to the network as a whole, or to parts of the network, for example RATs, or groups of cells. In this case, the ESS may be requested to apply ES at one level to the groups of cells under its control and then the ESS may seek to apply ES to the groups of cells. In this way, it can be seen that there can be two types of ES levels applied, a first type applied to the network as a whole, or to parts of the network, and a second type applied to individual cells as a result of applying the thresholds.

Although in the foregoing reference is made to the ESS being requested to apply ES, in one implementation of the invention, the recognition of the need to apply ES within the ESS does not come as a result of it receiving a request but instead there may be a determination made in the ESS that ES management is to be applied.

Although the thresholds are for a group of cells, in one implementation, respective, and potentially different, thresholds can be applied to individual cells of one RAT. This may mean that the cells in a group each have individual sets of thresholds applied to them.

Although it is indicated in the foregoing that because RAT prioritisation is implicit in the structure of the thresholds, it is not necessary to have a separate RAT prioritisation attribute. However, in an implementation of the invention in which thresholds can be changed by the ESS independently, for example if the ESS can tune thresholds on its own, then it may be useful to provide a RAT prioritisation attribute as an input for this tuning. In this way, rather than the threshold(s) being set by the higher level management system, they may be set by the ESS itself based on a traffic/service model (which can be made by traffic and/or service related performance measurements collected over a period of time).

One way in which the ESS can be instructed to act independently is if the AutonomousEnergySavingTarget attribute defined in Table 3 is set to "activated". In this case, the AutonomousEnergySavingControl attribute may instruct the ESS to use the values of InterRatESThresholdsList as they are. Alternatively, the ESS may set the thresholds to suitable values based on measurements it carries out, for example relating to current and/or historical loading of cells.

The thresholds can be in a composite form for multiple RATs with there being different thresholds for different RAT types as is the case in Table 4. Alternatively, there may be separate threshold sets, and thus attributes, defined in respect of each RAT.

If there are more than two RATs in the threshold list, after the ESS has switched off a first RAT following the load-based ES method of the third embodiment, the ESS can use the same method to switch off a second RAT, and any subsequent RATs in turn. This may occur by using a threshold list having thresholds associated with the RATs or by using a priority list if the ESS is acting autonomously as has been described previously.

The priority list of the first embodiment may be applied to the second embodiment. For example, if a time arrives when two RATS may be activated/deactivated following an ES request, the priority list can be referred to and activation/deactivation applied according to the order of that list. If may be determined that if, for example, deactivation of one RAT provides a level of ES deemed to be sufficient, deactivation of the other RAT does not have to take place.

It will be appreciated that a time schedule according to the second embodiment of the invention can be applied to groups, whether in combination with any other embodiments of the invention or not.

The request for ES to be applied can be a direct instruction from a SON server or a network operator. The ESS may be in a SON server layer (for example in the EM layer or above).

The NM layer may determine that there is a quiet/busy time/area in terms of load which means that a RAT, or a RAT in a particular area, can be deactivated/activated by an NMS instructing the ESS or to instructing network elements via the EM layer.

There may be a schedule for each RAT having its own activation and deactivation times or a single schedule for all RATs with respective activation/deactivation times for each RAT.

As will have been seen from the preceding description of the embodiments of the invention, the ESS may act in respect of groups of cells. Furthermore, the thresholds may be applied in order that cells have applied to them a suitable energy saving level. These features will now be described.

In relation to the groups feature, a group list may be provided which identifies cells of different RATs which provide service to the same or to a similar coverage area. The group may represent cells between which handovers may occur to allow handing-over cells to have their energy-consuming activities reduced in order to obtain ES. There may be 10 cells in a group. There may be 20. Other numbers of cells may be present in the group.

The group list may take the form of a group list attribute. In one implementation, the group list attribute, defined according to the following Table 5 in the following, is added to the SubNetwork IOC, or to an IOC to manage the energy saving cell group which may be under the SubNetwork IOC.

TABLE 5

| Attribute | Definition | Legal Values |
|---|---|---|
| CellListForInterRatEs | In case the energy saving function selects one or more cells for energy saving from this group, other cells in this group are responsible for taking over relevant services and retaining the coverage of the group | List of DN of the EUtranCell, UtranCells, GsmCells, cdmaCells etc |

In this table, DN is distinguished name. It represents individual cell identities.

Referring back to FIG. 1, the cells served by the base stations 108 to 118 may represent a group.

In relation to the energy levels feature, an energy level list may be provided which identifies different levels of energy saving which may be applied to cells or groups of cells. This may take the form of a group list attribute. In one implementation, the group list attribute, defined as energySavingLevel according to Table 6 in the following, is added to an EnergySavingProperties IOC, for example that of TS 32.762, or is added to an IOC specified to hold that attribute.

The energy saving levels indicate different energy consumption of a cell (or other NE). Although they are presented simplistically as ESlevel1, 2, 3, etc, these may correspond to vendor-specific settings. For example, a vendor may determine that ESlevel1 corresponds to a CPU being at 100%, 3 carriers being active, and an air conditioner in operation, ESlevel2 corresponds to a CPU being at 80%, 2 carriers being active, and an air conditioner in operation at low power, and ESlevel3 may correspond to a CPU being at 50%, a redundant board being deactivated, and an air conditioner being switched off. Another vendor may have different settings. In this way, the NE is able to receive a request to operate at a particular ESlevel and then be able to apply suitable specific ES measures to itself.

TABLE 6

| Attribute | Definition | Legal Values |
|---|---|---|
| energySavingLevel | Specifies the level of energy saving. The higher the level the less energy is used. | Enumerated { energySavingLevel1, energySavingLevel2, energySavingLevel3 }. |

As explained above, different configurations can be used which consume different amounts of energy. The EES may decide, for example based on load thresholds, to switch from one configuration to another one. This change will be reflected in a corresponding ESlevel change, so that a network operator can be kept informed about the current status of a network element. This information may be used by the ESS itself. In an example, two cells A and B in the same area are in ESlevel2. The ESS may calculate energy consumption for the cell A in ESlevel1 and the cell B in ESlevel3. If this turns out to be more advantageous from the perspective of energy consumption, the ESS can change the configurations of the cells A and B correspondingly.

In terms of a base station itself, switching between energy saving levels may relate to switching between numbers of active carriers. For example, in GSM there are several configurations called "4+4+4", "3+3+3", "2+2+2", "1+1+1" where the number indicates the number of carriers in one sector. Each of these configurations provides the same coverage, but a different total bandwidth, and consumes different amounts of energy. Changing from 4+4+4 to 3+3+3 may be based on a different threshold compared with changing from 3+3+3 to 2+2+2. Other RATs can have similar mappings of energy saving levels to operational configurations.

A network according to the invention may be able to avoid completely shutting down a RAT. It may be the case that one RAT, for example GSM, needs to be active to provide service to mobile terminals which solely rely on that technology. Having a number of thresholds allows an adaptation of energy saving, and energy consumption, to the load while maintaining service from RATs which need to be active.

Referring now the invention in general, it will be understood that the term "policies" can apply to some of the embodiments of this invention. It may refer to ES RAT prioritisation, indicating the order in which RATs may be deactivated, it may refer to ES time periods, indicating times at which identified RATs may be deactivated, and it may refer to load. The policies may be applied in combination so that if ES is invoked, then, for example, it will be applied according to a time schedule and also carried out in a RAT prioritisation order.

As will be seen from the foregoing, various implementations and/or features can be combined. As examples:
(i) The first embodiment can be combined with the group list feature, although such a combination is not necessarily needed.
(ii) The second embodiment can be combined with the group list feature, although such a combination is not necessarily needed. However, it may be advantageous because by knowing cell groups, and knowing better the capacity of RATs in the cell groups, it may be helpful to apply RAT prioritisation during time periods when traffic is shifting. In particular, the group list feature is useful to combine with the third variant of the second embodiment so that the ESS is able to act autonomously.

(iii) The third embodiment can be combined with the group list feature as has been described in the foregoing.

(iv) The first embodiment can be combined with the energy levels feature, although such a combination is not necessarily needed.

(v) The second embodiment can be combined with the energy levels feature. As an example, a schedule may be set to go into no-ES from 09 to 17, into ESlevel1 from 17 to 23, into ESlevel2 from 23 to 03, into ESlevel3 from 03 to 05, and into ESlevel1 from 05 to 07. Having a range of energy levels is desirable because in the normal course of operating a network, it helps in avoiding totally switching off a RAT for ES purposes. However, in a case in which ES does not mean the binary extremes of energy supplied or no energy supplied, and the maximum level of ES still provides coverage from a RAT, a range of energy levels may not strictly be necessary.

(vi) The third embodiment can be combined with the energy levels feature as has been described in the foregoing. If there is a range of energy levels, it is not necessary to totally switch off a RAT for ES purposes. However, if ES is expressed in terms of yes/no, there can still be a level of ES which provides coverage from a RAT.

(vii) The first, second, and third embodiments may be combined. There may be a combined embodiment in which RAT prioritisation of the first embodiment is applied according to a time schedule of the second embodiment. There may be a combined embodiment in which RAT prioritisation of the first embodiment is applied to load based ES of the third embodiment. There may be a combined embodiment in which a time schedule of the second embodiment is applied to load based ES of the third embodiment. There may be a combined embodiment in which RAT prioritisation of the first embodiment is applied to load based ES of the third embodiment according to a time schedule of the second embodiment.

Figure 2:
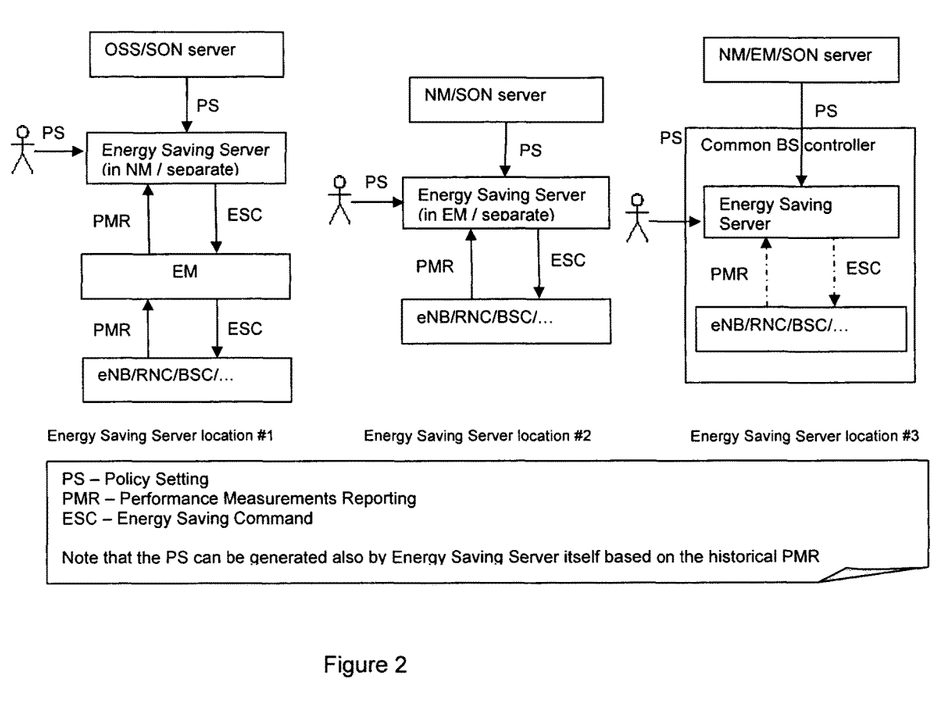
FIG. 2 shows a number of possible locations of an energy saving function.

In the foregoing, a number of possible locations of the ESS have been referred to. For example, it may be located in the NMS layer, in the EM layer, in an OAM function, in an operations and maintenance centre (OMC) or in a common controller functionality for different RATs. It may be a centralised functionality, such as a server, or it may be distributed. FIG. 2 shows a number of possible locations of the ESS. A first location, location #1, is in an NM layer. A second location, location #2, is in an EM layer. A third location, location #3, is in a common controller functionality. As shown in FIG. 2, the ESS may be located broadly at the level of a particular layer but exist as a separate functionality. It may be associated with a layer but located outside of the layer.

The ESS operates with the support from an external management interface. In a preferred implementation, the ESS may be incorporated into an operations support system (OSS) provided by Nokia Siemens Networks such as NetAct with support via the Itf-N.

The following examples show in the typical format of a 3GPP 32.series stage 2 description how the solutions described in § 4 can be realized.

According to the invention, account may be taken of the different service capabilities of different RATs. ES management functions may support efficient management of when and how to (partially) switch off the cell(s) of a selected RAT to avoid/minimise the negative impact to services in different circumstances. This may avoid the ESS improperly switching off the cells of a more service-rich RAT (for example LTE), in case additional services are requested which cannot be fully supported by another RAT (for example GSM). Additional service may require additional capacity, for example file sharing, or media streaming.

It will be understood from the foregoing that it is possible to apply different levels of ES to different RATs in a network, and ultimately to different cells in a RAT.

It will be recognised that an advantage of the invention is to provide service continuity to mobile terminals being served by a network while applying ES to the network.

While preferred embodiments of the invention have been shown and described, it will be understood that such embodiments are described by way of example only. Numerous variations, changes and substitutions will occur to those skilled in the art without departing from the scope of the present invention. Accordingly, it is intended that the following claims cover all such variations or equivalents as fall within the spirit and the scope of the invention.

The invention claimed is:

1. A method of energy saving in a mobile communications network comprising at least two radio access technology systems having a plurality of access points, the method comprising the steps of:
providing an energy saving server, wherein the energy saving server is provided in a network management layer or an element management layer;
assigning respective priorities to the radio access technology systems, wherein the priorities are in the form of a priority list indicating the radio access technology systems and an order in which the radio access technology systems are to be reduced in an operational state; and
instructing, on the basis of the priorities and according to a time schedule indicating times at which energy saving is to be activated and deactivated, at least one of the at least two radio access technology systems to reduce the operational state of at least one of the plurality of access points in order to provide energy saving.

2. The method according to claim 1, wherein the instructing is carried out with respect to a group of access points within the plurality of access points which identifies cells of different radio access technology systems which provide service to common coverage areas.

3. The method according to claim 1, wherein the mobile communication network has an energy saving functionality which instructs the at least one radio access technology system that reducing the operational state is requested.

4. The method according to claim 3, wherein deciding to reduce the operational state of the at least one radio access technology system on the basis of whether a sufficient level of service will be maintained.

5. The method according to claim 1, wherein in the case that the operational state of at least one radio access technology system is reduced, mobile terminals served by the at least one radio access technology system which now are no longer to be served, are handed over to the cells of another one of the at least two radio access technology systems.

6. The method according to claim 1, wherein energy saving is carried out taking load into account by means of a threshold list.

7. The method according to claim 6, wherein a threshold is associated with a particular radio access technology system.

8. The method according to claim 1, wherein a request to change energy saving levels of cells in a group is applied to some cells and not to others so that cells have their energy saving levels changed by different amounts.

9. A communication system configured to provide energy saving, the communication system comprises:
at least two radio access technology systems having a plurality of access points; and
a management functionality capable of assigning respective priorities to the at least two radio access technology systems, wherein the priorities are in the form of a priority list indicating the radio access technology systems and an order in which the radio access technology systems are to be reduced in an operational state, and capable of instructing, on the basis of the priorities and according to a time schedule indicating times at which energy saving is to be activated and deactivated, at least one of the at least two radio access technology systems to reduce the operational state of at least one of the plurality of access points in order to provide energy saving, wherein the management functionality is provided in a network management layer or an element management layer.

10. An energy saving functionality configured for energy saving in a mobile communications network comprising at least two radio access technology systems having a plurality of access points, the energy saving functionality being capable of assigning respective priorities to the at least two radio access technology systems, wherein the priorities are in the form of a priority list indicating the radio access technology systems and an order in which the radio access technology systems are to be reduced in an operational state, and being capable of instructing, on the basis of the priorities and according to a time schedule indicating times at which energy saving is to be activated and deactivated, at least one of the at least two radio access technology systems to reduce the operational state of at least one of the plurality of access points in order to provide energy saving, wherein the energy saving functionality is provided in a network management layer or an element management layer.

11. A computer program product embodied on a non-transitory computer readable medium comprising software code that when executed on a computing system performs a method of energy saving in a mobile communications network comprising at least two radio access technology systems having a plurality of access points, the method comprising the steps of:
providing an energy saving functionality, wherein the energy saving functionality is provided in a network management layer or an element management layer;
assigning respective priorities to the radio access technology systems, wherein the priorities are in the form of a priority list indicating the radio access technology systems and an order in which the radio access technology systems are to be reduced in an operational state; and
instructing, on the basis of the priorities and according to a time schedule indicating times at which energy saving is to be activated and deactivated, at least one of the at least two radio access technology systems to reduce the operational state of at least one of the plurality of access points in order to provide energy saving.

* * * * *